US012275451B1

United States Patent
Buzzard et al.

(10) Patent No.: US 12,275,451 B1
(45) Date of Patent: Apr. 15, 2025

(54) STEERING COLUMN RAKE LOCK MECHANISM

(71) Applicant: Steering Solutions IP Holding Corporation, Saginaw, MI (US)

(72) Inventors: Donald A. Buzzard, Saginaw, MI (US); Michael P. Anspaugh, Bay City, MI (US); Matthew J T Vincent, Saginaw, MI (US); Todd Barshaw, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 18/485,398

(22) Filed: Oct. 12, 2023

(51) Int. Cl.
*B62D 1/184* (2006.01)
*B62D 1/189* (2006.01)

(52) U.S. Cl.
CPC .............. *B62D 1/184* (2013.01); *B62D 1/189* (2013.01)

(58) Field of Classification Search
CPC .......... B62D 1/184; B62D 1/187; B62D 1/18; B62D 1/16; B62D 1/189; B60Y 2410/12
USPC .................................... 280/775; 74/493, 492
See application file for complete search history.

(56) References Cited

U.S. PATENT DOCUMENTS

| | | | | |
|---|---|---|---|---|
| 11,260,895 | B2 * | 3/2022 | Lingemann | B62D 1/184 |
| 11,891,110 | B1 * | 2/2024 | Messing | B62D 1/187 |
| 2009/0013817 | A1 * | 1/2009 | Schnitzer | B62D 1/184 |
| | | | | 74/493 |
| 2015/0053041 | A1 * | 2/2015 | Schnitzer | F16F 7/06 |
| | | | | 74/493 |
| 2017/0008549 | A1 * | 1/2017 | Tomiyama | B62D 1/187 |
| 2018/0170419 | A1 * | 6/2018 | Blättler | B62D 1/184 |
| 2019/0111962 | A1 * | 4/2019 | Kurokawa | B62D 1/184 |
| 2019/0382043 | A1 * | 12/2019 | Dubay | B62D 1/184 |
| 2021/0206420 | A1 * | 7/2021 | Anspaugh | B62D 1/184 |
| 2022/0073126 | A1 * | 3/2022 | Geiger | B62D 1/184 |
| 2022/0227409 | A1 * | 7/2022 | Carl | B62D 1/184 |

FOREIGN PATENT DOCUMENTS

JP 2017197007 A * 11/2017
KR 20230049262 A * 4/2023

* cited by examiner

*Primary Examiner* — Keith J Frisby
(74) *Attorney, Agent, or Firm* — Dickinson Wright PLLC

(57) ABSTRACT

An integrated locking feature for a rake lock mechanism of a steering column assembly includes a toothed portion. The integrated locking feature also includes a driver portion. The integrated locking feature further includes a spring portion coupling the driver portion and the toothed portion, wherein the toothed portion, the driver portion and the spring portion are integrally formed with each other as a single, uniform structure, wherein the spring portion has a thickness less than a thickness of the toothed portion.

13 Claims, 6 Drawing Sheets

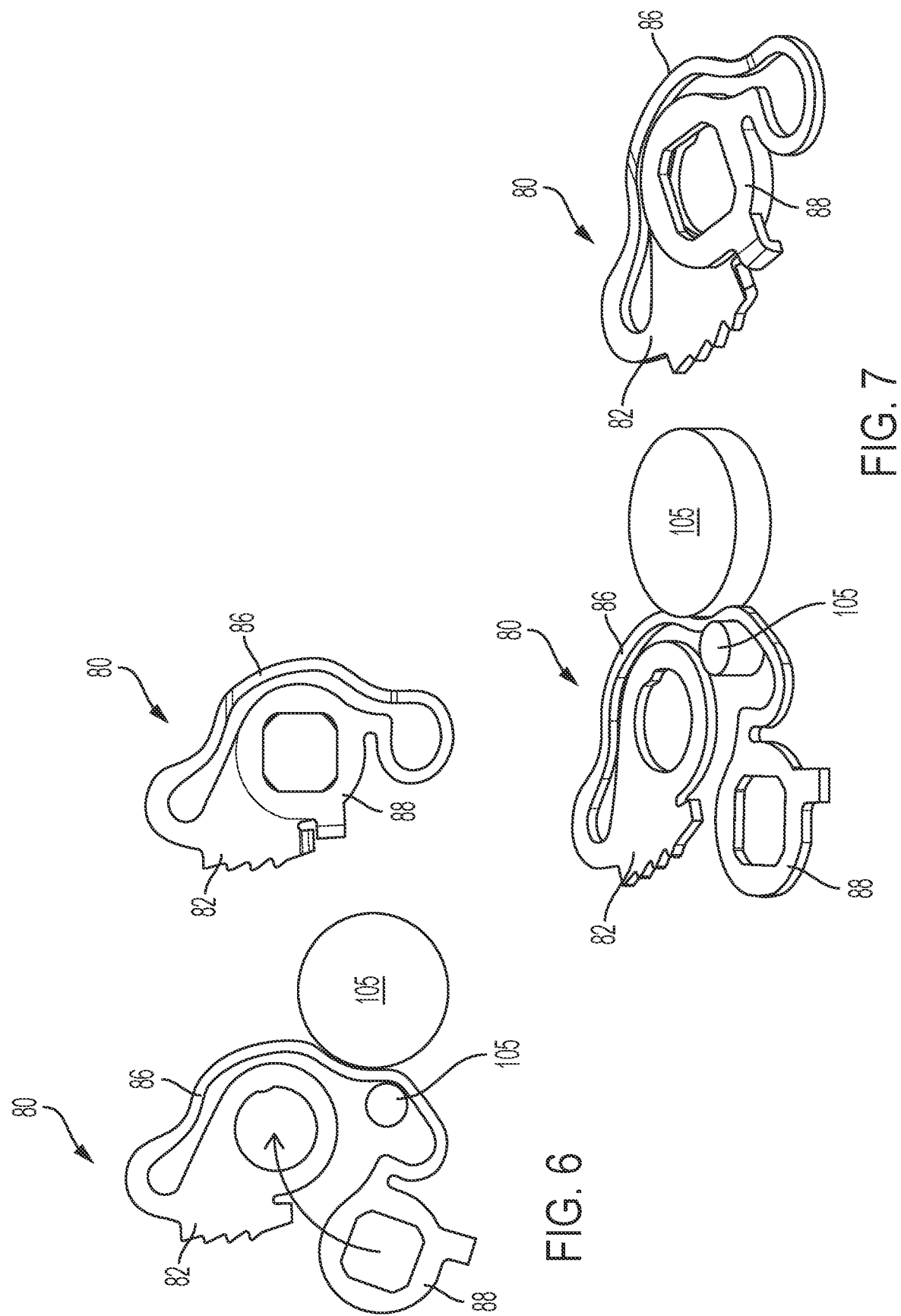

STEERING COLUMN RAKE LOCK MECHANISM

TECHNICAL FIELD

The following description relates to vehicle steering systems and, more particularly, to a steering column rake lock mechanism.

BACKGROUND

A vehicle, such as a car, truck, sport utility vehicle, crossover, mini-van, marine craft, aircraft, all-terrain vehicle, recreational vehicle, or other suitable vehicles, include various steering system schemes. These steering system schemes typically include a steering column for translating steering input to an output that interacts with a steering linkage to ultimately cause the vehicle wheels (or other elements) to turn the vehicle.

Some steering columns have the ability to adjust vertically (up/down) to allow for a more comfortable user interface. At the same time, such steering columns must meet customer defined collapse rake holding load requirements. In some cases, a toothed locking device is employed to meet the requirement. For example, a cam teeth profile may be used. However, such configurations require multiple separate components which are assembled together as a final locking mechanism assembly. In particular, a powdered metal teeth cam, a spring and a driver may need to be separately formed and assembled. The assembly requires specialized automated tooling.

SUMMARY

According to one aspect of the disclosure, a rake lock mechanism for a steering column includes a rake bolt. The rake lock mechanism also includes a rake lock bracket having a plurality of teeth. The rake lock further includes an integrated locking feature coupled to the rake bolt and rotatable therewith. The integrated locking feature includes a toothed portion engaged with the plurality of teeth of the rake lock bracket in a locked condition and disengaged from the plurality of teeth of the rake lock bracket in an unlocked condition. The integrated locking feature also includes a driver portion. The integrated locking feature further includes a spring portion coupling the driver portion and the toothed portion, wherein the toothed portion, the driver portion and the spring portion are integrally formed with each other as a single, uniform structure.

According to another aspect of the disclosure, an integrated locking feature for a rake lock mechanism of a steering column assembly includes a toothed portion. The integrated locking feature also includes a driver portion. The integrated locking feature further includes a spring portion coupling the driver portion and the toothed portion, wherein the toothed portion, the driver portion and the spring portion are integrally formed with each other as a single, uniform structure, wherein the spring portion has a thickness less than a thickness of the toothed portion.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 6 is an elevation view of the integrated locking feature being formed during a manufacturing process;

FIG. 7 is a perspective view of the integrated locking feature being formed during the manufacturing process;

DETAILED DESCRIPTION

Figure 1:
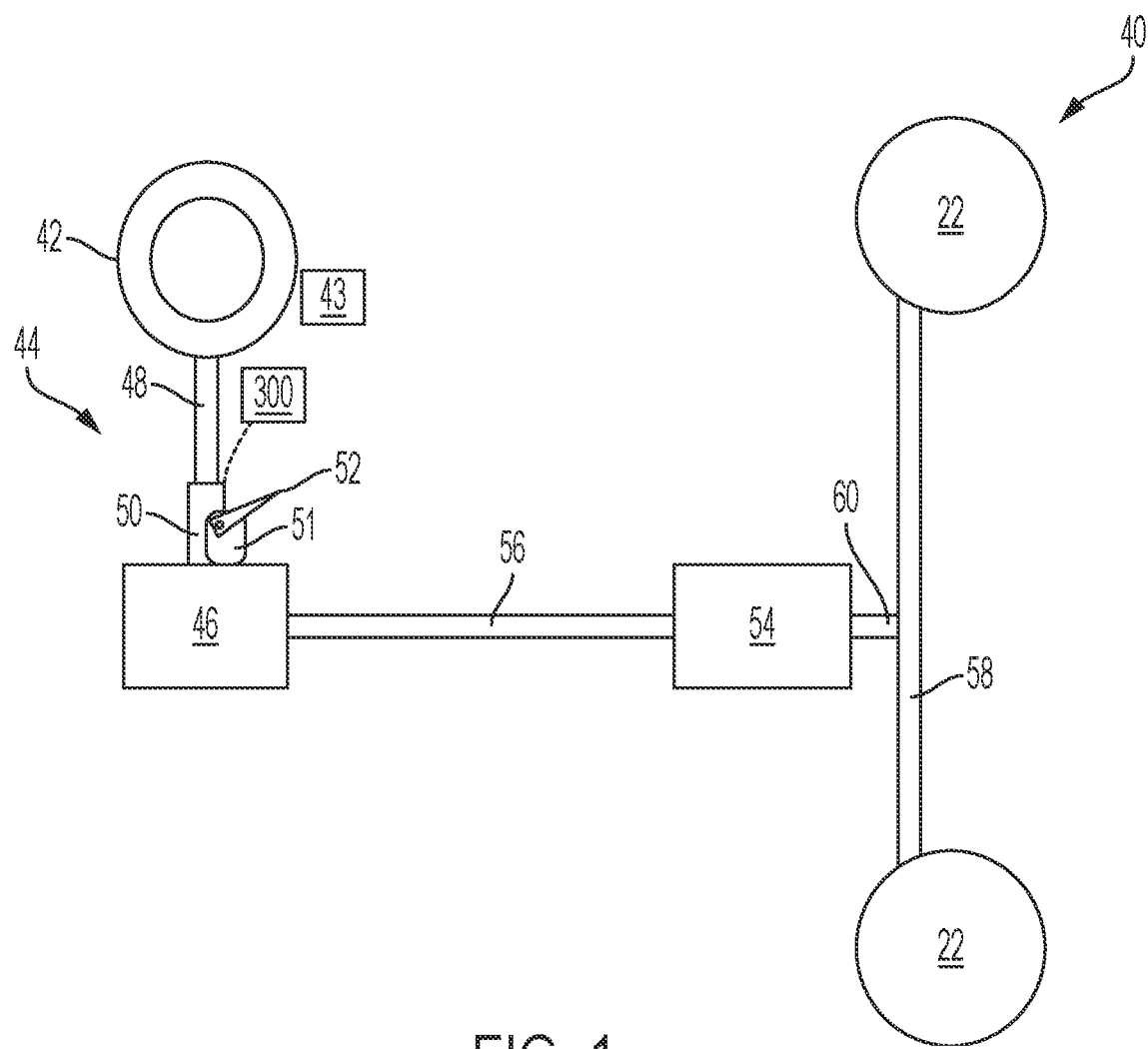
FIG. 1 schematically depicts a steering system including an adjustable steering column assembly.

The following discussion is directed to various embodiments of the disclosure. The embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Referring now to the drawings, where the various embodiments are shown and described herein, without limiting same, the Figures illustrate embodiments of a steering column assembly that is vertically adjustable and includes a locking mechanism that reduces part count, as well as manufacturing and assembly complexity.

Referring initially to FIG. 1, a steering system 40 for a vehicle is schematically illustrated according to the principles of the present disclosure. The vehicle may include any suitable vehicle, such as a car, a truck, a sport utility vehicle, a mini-van, a crossover, any other passenger vehicle, any suitable commercial vehicle, or any other suitable vehicle. Moreover, principles of the present disclosure may apply to other vehicles, such as aircrafts, boats, trains, drones, or other vehicles.

The steering system 40 may be configured as a driver interface steering system, an autonomous driving system, or a system that allows for both driver interface and autonomous steering. The steering system may include an input device 42, such as a steering wheel, wherein a driver may mechanically provide a steering input by turning the steering wheel. An airbag device 43 may be located on or near the input device 42. A steering column assembly 44 extends along an axis from the input device 42 to an output assembly 46. The output assembly 46 may include a pinion shaft assembly, an I-shaft, a cardan joint, steer-by-wire components or any other features conventionally located opposite the input device 42. The steering column assembly 44 may include at least two axially adjustable parts, for example, a first jacket 48 and a second jacket 50 that are axially adjustable with respect to one another. The first jacket 48 and the second jacket 50 may be alternatively configured as brackets, rails, or other members that permit axial movement therebetween. The first jacket 48 may be referred to as an "upper jacket" and the second jacket 50 may be referred to as a "lower jacket". The axial movement may include sliding, telescopic, translating, and other axial movements. In other embodiments, more than two jackets or fewer than two jackets may be present. The steering column assembly 44 may include a bracket 51 that at least partially connects the steering column to the vehicle 10.

An adjustable lever 52 may be operably connected to one of the first jacket 48, the second jacket 50, or the bracket 51 to facilitate vertical adjustment of the steering column assembly 44. Vertical adjustment may also be referred to herein as rake adjustment. In some embodiments, behavior of the adjustable lever 52 is controlled via a control system 300 including a CPU unit. In some embodiments, behavior of the adjustable lever 52 is controlled manually. The steering column assembly 44 is moveable over a range of vertical positions from a lowermost position to an uppermost position. While the adjustability is referred to as "vertical" herein, it is to be understood that the movement of one or more portions of the steering column assembly 44, including the input device 42, may be made in an arc rather than pure translation within a single plane.

A steering gear assembly 54 may connect to the output assembly 46 via a steering gear input shaft 56. The steering gear assembly 54 may be configured as a rack-and-pinion, a recirculating ball-type steering gear, or any other types of steering gears associated with autonomous and driver-interface steering systems. The steering gear assembly 54 may then connect to a driving axle 58 via an output shaft 60. The output shaft 60 may include a pitman arm and sector gear or other traditional components. The output shaft 60 is operably connected to the steering gear assembly 54 such that a rotation of the steering gear input shaft 56 causes a responsive movement of the output shaft 60 and causes the drive axle to turn the wheels 22. In other embodiments, the steering column assembly 44 is not directly mechanically connected to the steering gear assembly 54. Such an embodiment may be referred to as a steer-by-wire system.

Figure 2:
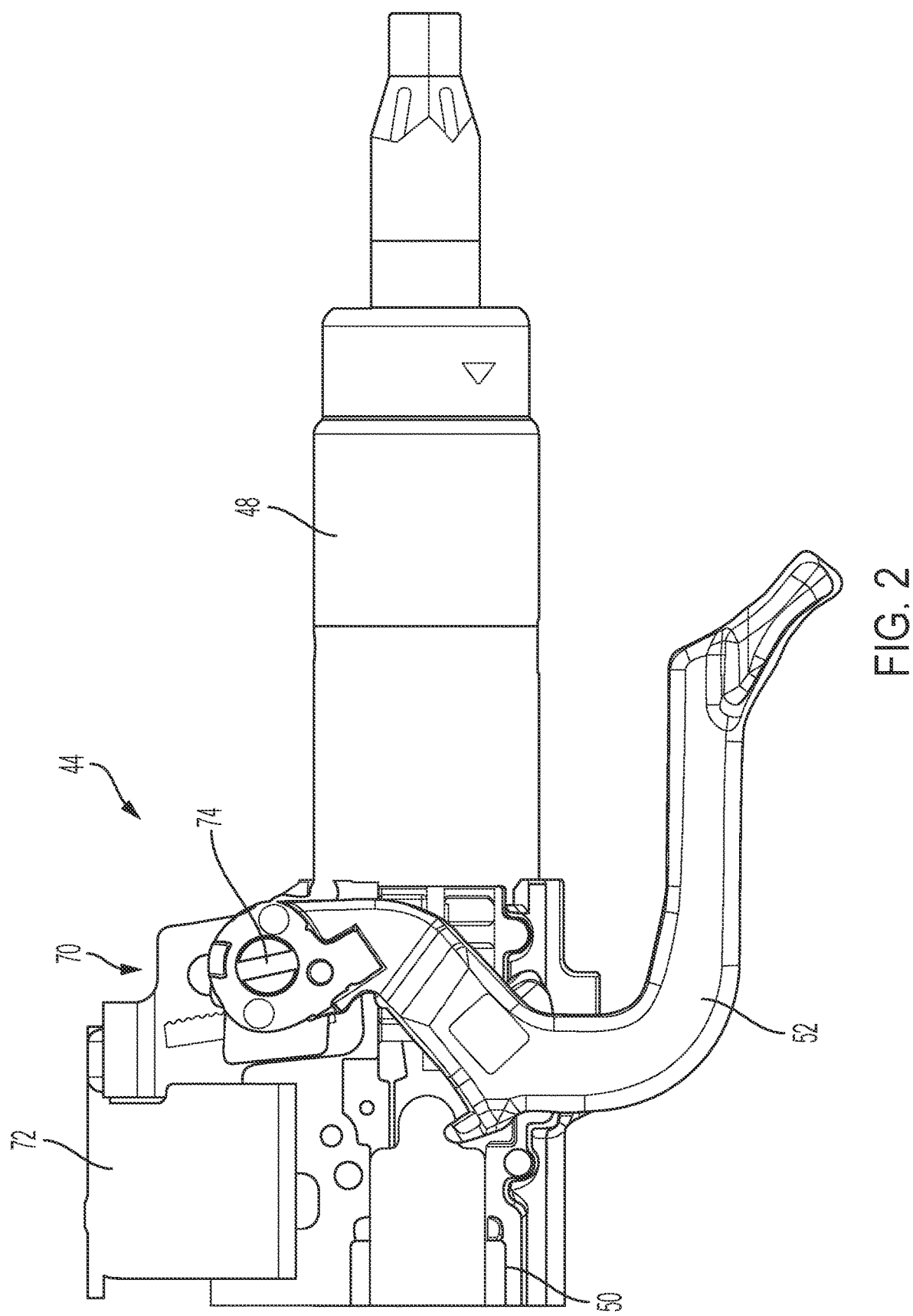
FIG. 2 is an elevation view of a portion of the adjustable steering column assembly illustrating an adjustment lever for controlling a rake lock mechanism.

FIG. 2 illustrates a portion of the steering column assembly 44 in greater detail. In particular, the first jacket 48 and the second jacket 50 are shown. A rake lock mechanism 70 for selectively locking and unlocking rake adjustability of the steering column assembly 44 is illustrated. The rake lock mechanism 70 is operatively coupled to the lower jacket 50 and/or a mounting bracket 72. The rake lock mechanism 70 includes the adjustable lever 52, a rake bolt 74 and a plurality of components which coordinate to move the rake lock mechanism 70 between a locked condition and an unlocked condition.

Figure 3:
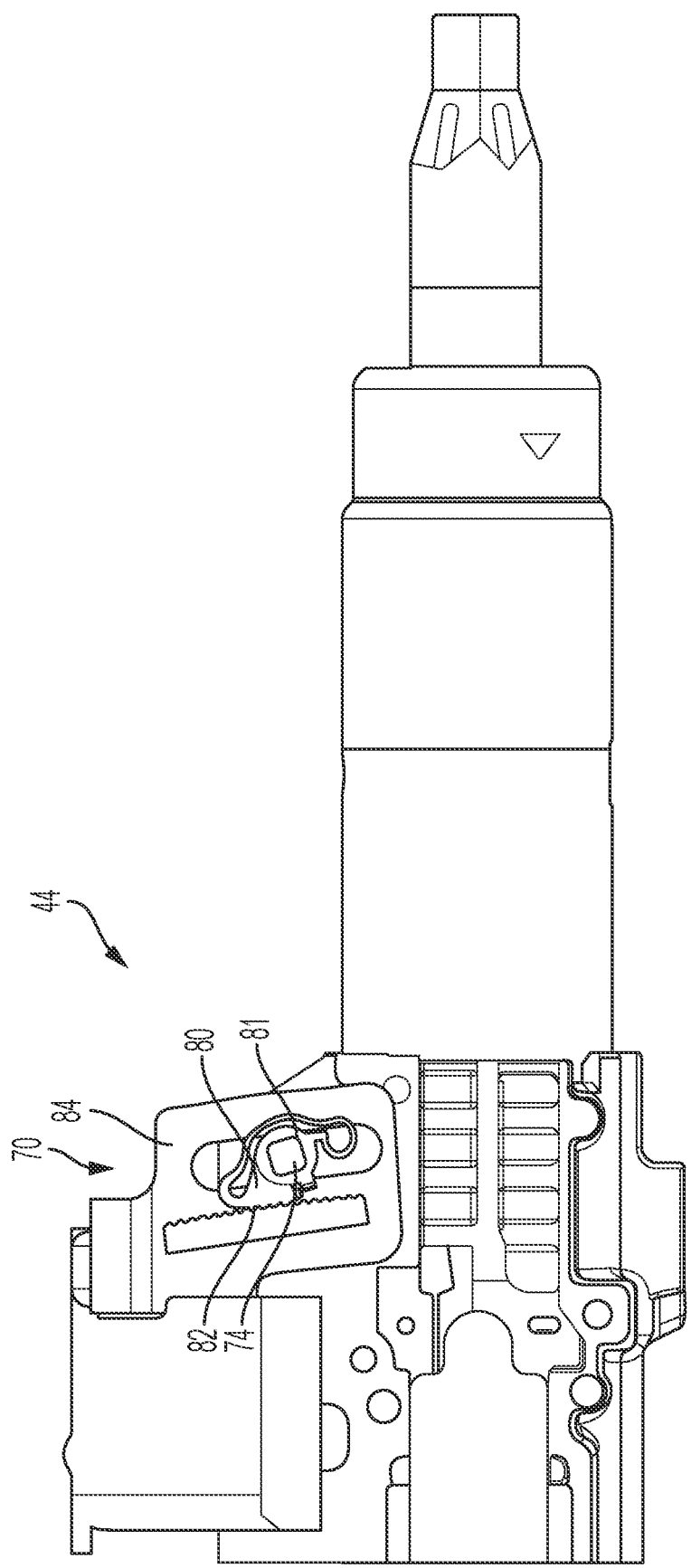
FIG. 3 is an elevation view of the portion of the adjustable steering column assembly with the adjustment lever removed to illustrate the rake lock mechanism.

FIG. 3 illustrates the portion of the steering column assembly 44 shown in FIG. 2, but with the adjustable lever 52 removed to more clearly show an integrated locking feature 80 which is part of the rake lock mechanism 70. The integrated locking feature 80 defines a hole 81 sized and geometrically configured to surround a portion of the rake bolt 74. The integrated locking feature 80 includes a toothed portion 82 which is positioned to move into and out of engagement with corresponding teeth of a rake bracket 84. Engagement between the toothed portion 82 and the teeth of the rake bracket 84 place the rake lock mechanism 70 in the locked condition, while separation of the toothed portion 82 and the teeth of the rake bracket 84 place the rake lock mechanism 70 in the unlocked condition. The adjustable lever 52 (FIG. 2) rotates the rake bolt 74 which causes rotation of the integrated locking feature 80 due to the fit between the rake bolt 74 and the integrated locking feature 80.

Figure 5:
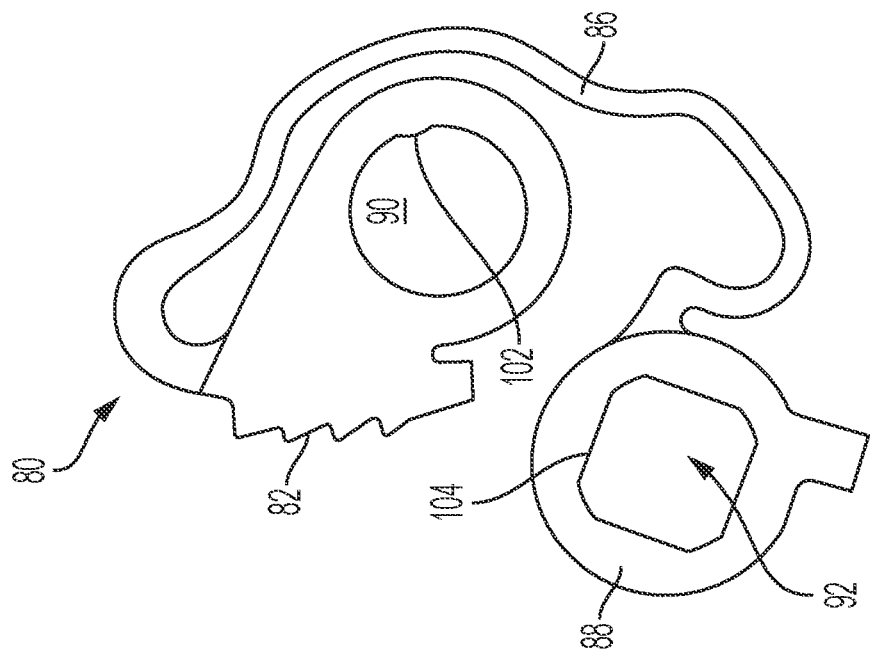
FIG. 5 is an elevation view of the integrated locking feature.
Figure 4:
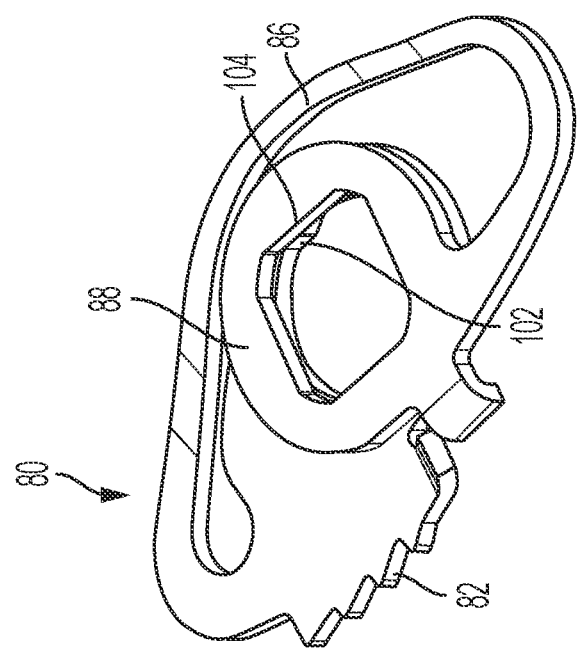
FIG. 4 is a perspective view of an integrated locking feature of the rake lock mechanism.

Referring now to FIGS. 4 and 5, the integrated locking feature 80 is shown in greater detail. The term "integrated" is used to describe the integrated locking feature 80 based on the integrally formed construction of three portions of the integrated locking feature 80. In particular, the integrated locking feature 80 includes the toothed portion 82, a spring portion 86, and a driver portion 88. The portions of the integrated locking feature 80 are monolithically formed in any suitable manner, such as a metal stamping, for example. This is distinct from prior locking mechanisms which require sub-components assembled to each other.

Figure 9:
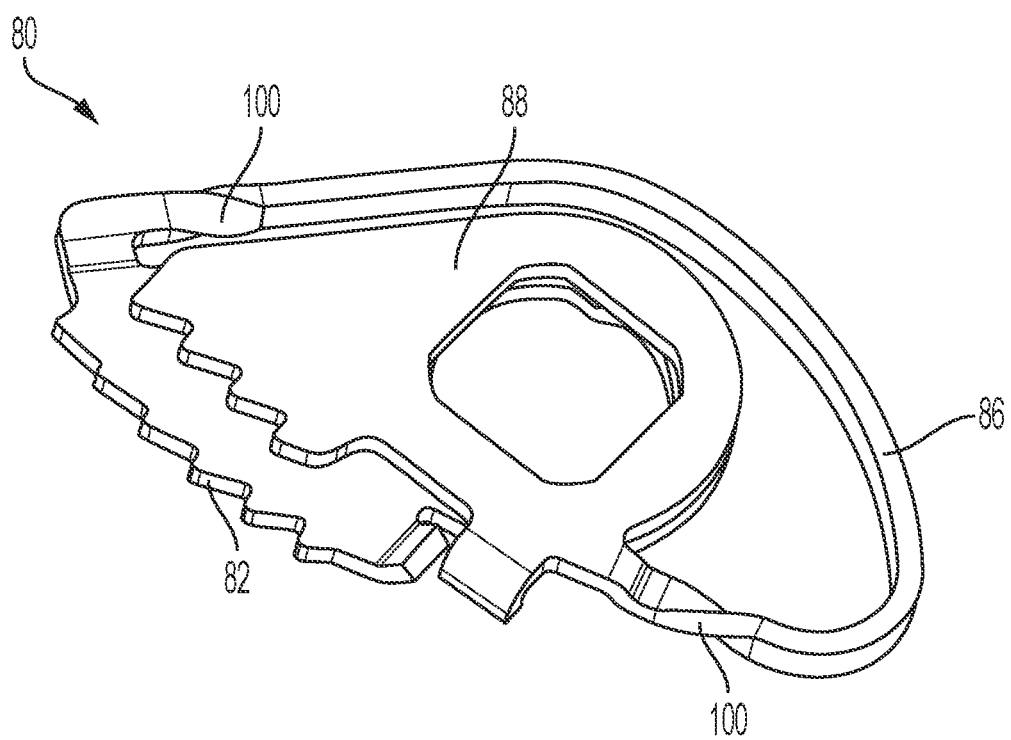
FIG. 9 is a perspective view of the integrated locking feature according to another aspect of the disclosure.

The spring portion 86 has dimensions (e.g., width, thickness, length) which may be customized to produce the desired spring effect on the overall integrated locking feature 80 for various applications of use. While the spring portion 86 may have a substantially constant cross-section and surface profile in some embodiments, it is to be appreciated that the spring portion 86 may have one or more twisted regions 100 in other embodiments (FIG. 9). The location and extent of the twisted region(s) 100 provide additional customization capabilities.

The toothed portion 82 of the integrated locking feature 80 includes a triangular inner wall segment 102 in some embodiments, as shown in FIGS. 4 and 5. The triangular inner wall segment 102 protrudes inwardly to match a flat inner wall segment 104 of the driver portion 88.

It is to be noted that FIG. 4 shows the integrated locking feature 80 in a final constructed form, while FIG. 5 depicts the integrated locking feature 80 prior to bending into the final constructed form. As shown in FIG. 5, the above-described hole 81 defined by the integrated locking feature 80 is actually defined by a first hole 90 formed in the toothed portion 82 and a second hole 92 formed in the driver portion 88. As shown in FIG. 4, the first hole 90 and the second hole 92 overlap in the final constructed form to define the hole 81 to accommodate the rake bolt 74. Bending the integrated locking feature 80 into the final constructed form may be done in any suitable metal yielding manner or alternative processes for metal or other materials. This bending process is generally shown in FIGS. 6 and 7, where one or more components 105 are in contact with the integrated locking feature to properly bend and align the toothed portion 82 and the driver portion 88 to the final, desired orientation.

Figure 8:
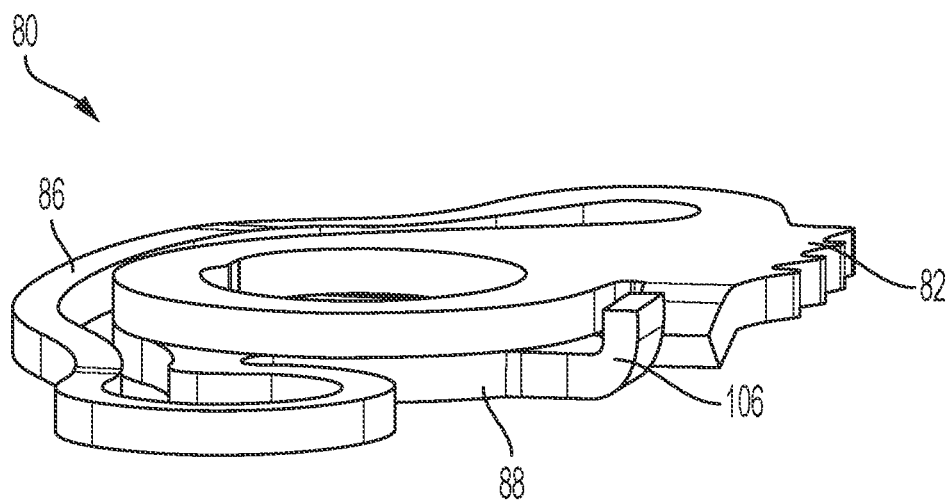
FIG. 8 is another perspective view of the integrated locking feature.

As shown in FIG. 8, the integrated locking feature 80 has little to no clearance between the toothed portion 82 and the driver portion 88. Additionally, in the final constructed form, the driver portion 88 includes a bent segment 106 which is located in close proximity to an end of the toothed portion 82 of the integrated locking feature 80. Contact between the bent segment 106 and the toothed portion 82 may occur when the teeth of the toothed portion 82 are having difficulty disengaging from the teeth of the rake bracket 84. Such contact assists with disengagement to move the integrated locking feature 80 toward the unlocked condition of the rake lock mechanism 70.

The embodiments disclosed herein beneficially incorporate elements from assemblies requiring two or three sub-components into a one-piece feature made from metal, such as stamped steel. The integrated locking feature 80 advantageously reduces part count and assembly complexity.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A rake lock mechanism for a steering column comprising:
   a rake bolt;
   a rake lock bracket having a plurality of teeth; and
   an integrated locking feature coupled to the rake bolt and rotatable therewith, the integrated locking feature comprising:
      a toothed portion engaged with the plurality of teeth of the rake lock bracket in a locked condition and disengaged from the plurality of teeth of the rake lock bracket in an unlocked condition;
      a driver portion, wherein the toothed portion defines a first hole and the driver portion defines a second hole, wherein the first hole and the second hole overlap to receive the rake bolt therethrough; and
      a spring portion coupling the driver portion and the toothed portion, wherein the toothed portion, the driver portion and the spring portion are integrally formed with each other as a single, uniform structure.

2. The rake lock mechanism of claim 1, wherein the driver portion includes a bent segment located proximate an end of the toothed portion.

3. The rake lock mechanism of claim 1, wherein the integrated locking feature is formed of steel.

4. The rake lock mechanism of claim 1, wherein the spring portion has a thickness that is less than a thickness of the toothed portion.

5. The rake lock mechanism of claim 1, wherein the spring portion has a thickness that is less than a thickness of the driver portion.

6. The rake lock mechanism of claim 1, wherein the spring portion extends in an untwisted orientation along an entire length thereof.

7. The rake lock mechanism of claim 1, wherein the toothed portion includes a triangular inner wall segment protruding inwardly to match a flat inner wall segment of the driver portion.

8. An integrated locking feature for a rake lock mechanism of a steering column assembly comprising:
   a toothed portion;
   a driver portion, wherein the toothed portion includes a triangular inner wall segment protruding inwardly to match a flat inner wall segment of the driver portion; and
   a spring portion coupling the driver portion and the toothed portion, wherein the toothed portion, the driver portion and the spring portion are integrally formed with each other as a single, uniform structure, wherein the spring portion has a thickness less than a thickness of the toothed portion.

9. The integrated locking feature of claim 8, wherein the toothed portion defines a first hole and the driver portion defines a second hole, wherein the first hole and the second hole overlap.

10. The integrated locking feature of claim 8, wherein the driver portion includes a bent segment located proximate an end of the toothed portion.

11. The integrated locking feature of claim 8, wherein the integrated locking feature is formed of steel.

12. The integrated locking feature of claim 8, wherein the spring portion has a thickness that is less than a thickness of the driver portion.

13. The integrated locking feature of claim 8, wherein the spring portion extends in an untwisted orientation along an entire length thereof.

* * * * *